(12) United States Patent
Hallsten et al.

(10) Patent No.: US 6,401,654 B1
(45) Date of Patent: Jun. 11, 2002

(54) TEAT CUP HOLDER RACK

(75) Inventors: Goran Hallsten, Taby; Ann Louise Maria Horberg, Vasterhaninge; Leif Johannesson, Tullinge, all of (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/720,457

(22) PCT Filed: Jun. 23, 1999

(86) PCT No.: PCT/SE99/01135

§ 371 (c)(1),
(2), (4) Date: Mar. 1, 2001

(87) PCT Pub. No.: WO99/66786

PCT Pub. Date: Dec. 29, 1999

(30) Foreign Application Priority Data

Jun. 24, 1998 (SE) .............................................. 9802242

(51) Int. Cl.[7] .................................................. A01J 7/02
(52) U.S. Cl. .................................. 119/14.18; 119/14.51
(58) Field of Search ........................... 119/14.01, 14.02, 119/14.51, 14.18; 134/166 C, 169 C (56) References Cited

U.S. PATENT DOCUMENTS

| | | | |
|---|---|---|---|
| 3,012,566 A | 12/1961 | Baker | |
| 3,629,005 A | 12/1971 | Belden | |
| 3,834,407 A | 9/1974 | Heitman | |
| 3,958,584 A | * 5/1976 | Jones | 119/14.18 |
| 4,516,592 A | 5/1985 | Schultz et al. | |
| 5,383,423 A | * 1/1995 | van der Lely | 119/14.02 |
| 5,386,799 A | * 2/1995 | Dietrich | 119/14.51 |

FOREIGN PATENT DOCUMENTS

| | | |
|---|---|---|
| EP | 0213660 a1 | 3/1987 |
| WO | WO 8700396 | 1/1987 |
| WO | WO 9532615 | 12/1995 |
| WO | WO 9608137 | 3/1996 |
| WO | WO 9846069 | 10/1998 |

* cited by examiner

*Primary Examiner*—Yvonne R. Abbott
(74) *Attorney, Agent, or Firm*—Young & Thompson (57) ABSTRACT

The present invention relates to a device and a method for cleaning teat cups (21) in a milking machine. It comprises a teat cup holding rack (1) having a teat cup (21) connected to a milk line (11), teat cup cleaning device (25) with cleaning fluid supply device such as a nozzle (41) and teat cup storing (19', 19"), milk line actuator (9, 53, 55) for retracting the milk line (11) until the teat cup (21) is positioned upside down and in contact with the teat cup storing device (19', 19"); and teat cup cleaning driver actuator (13") for moving the cleaning fluid supply device (41) from a position not underneath said teat cup (21) to a position substantially vertically below the teat cup (21).

10 Claims, 7 Drawing Sheets

TEAT CUP HOLDER RACK

TECHNICAL FIELD OF THE INVENTION

The present invention relates to a device and a method for storing and cleaning teat cups in a milking machine.

DESCRIPTION OF RELATED ART

European patent application no. EP 213 660 describes an automatic milking apparatus which is intended to milk dairy animals without the continuous presence of an operator. The device contains a teat cup holding and cleaning apparatus where teat cups are arranged upside-down on sprayers. The teat cups can be picked up from the sprayers by a robot arm. Each teat cup is returned to the sprayers by a traction cable which draws the teat cup to a stop above the sprayer and then allows the teat cup to drop onto the sprayer. A problem with this device is that no means are provided for cleaning the milk line from each teat cup. Furthermore as each teat cup has both a milk line and a traction cable there is a large risk present that a milk line or traction cable will become caught on the animal being milked or the milking apparatus.

SUMMARY

An object of the present invention is to overcome the problems associated with prior art teat cup holding apparatuses.

An object of the present invention is to provide a teat cup rack which can store at least one teat cup in a suitable storage position so that it can be picked up by a robot arm before being attached to a teat.

A further object of the present invention is to provide a teat cup rack which can permit unobstructed movement during milking of a milk line attached to the teat cup.

A further object of the present invention is to provide a teat cup rack which can remove the teat cup from a teat after milking and return it to the storage position.

A further object of the present invention is to provide a teat cup rack which can position the teat cup for rinsing and washing.

A further object of the present invention is to provide a teat cup rack which can rinse the inside of the teat cup between each milking.

A further object of the present invention is to provide a teat cup rack which can clean the inside of the teat cup, the inside of the milk line and the exterior of the equipment.

A further object of the present invention is to provide a teat cup rack which can rinse the outside of the teat cup and the outside of the milk line between each milking.

A further object of the present invention is to provide a teat cup rack which can store the teat cup when there is no power supplied to the rack.

The invention will be described in more detail by means of non-limiting examples of embodiments and with reference to the accompanying drawings.

The objects of the invention are achieved by a teat cup holding rack for a milking machine in accordance with the invention as described below. The teat cup holding rack preferably comprises a frame provided with teat cup storing means, milk line guiding means, milk line retracting means, teat cup cleaning means, manoeuvring means for the teat cup cleaning means, equipment rinsing means and control means.

DETAILED DESCRIPTION OF THE EMBODIMENTS

Figure 1:
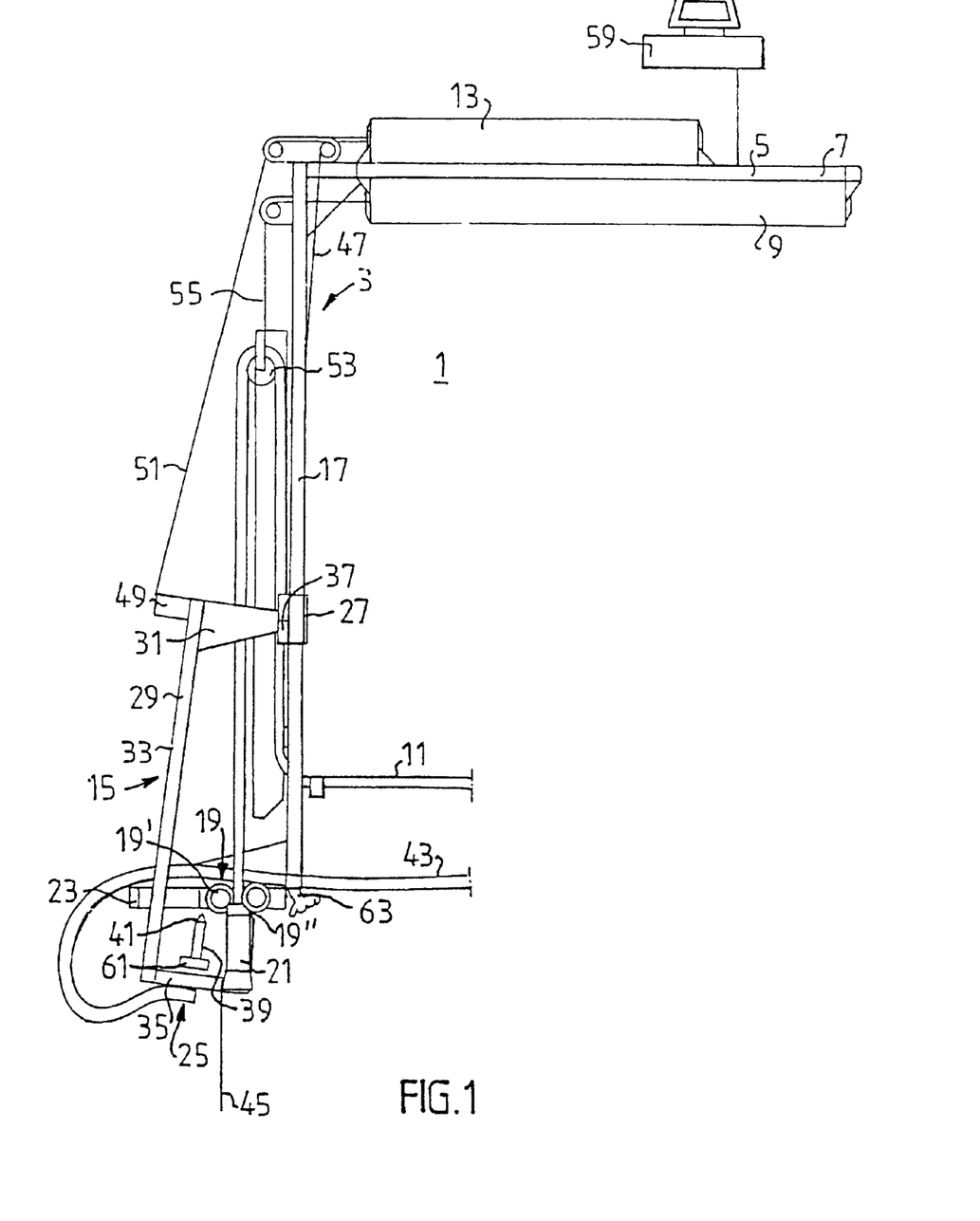
FIG. 1 shows an end view of an embodiment of a teat cup holding rack in accordance with the invention with a teat cup in the stored position.

An end view of first embodiment of a teat cup holding rack 1 in accordance with the present invention can be seen in FIG. 1. In this view one teat cup and its associated equipment can be seen, it being understood that a teat cup holding rack in accordance with the invention would in practice be comprised of a plurality of such devices, preferably one for each teat of the diary animal being milked. Teat cup holding rack 1 preferably comprises a frame 3 of the type usually found in milking machine and hence not shown in detail. Frame 3 has an upper substantially horizontal supporting frame 5 comprising a number of horizontal rails 7 which support actuating means 9 for retracting a milk line 11 and actuating means 13 for a cleaning means 15. Cleaning means actuating means 13 preferably comprises a first and a second individually operable actuator 13', 13" resp. Actuating means 9, 13', 13" are preferably vacuum cylinders 9, 13', 13" each connectable via a valve (not shown) to a vacuum (underpressure) source (not shown) by an individual vacuum line (not shown). Connected to one end of horizontal supporting frame 5 and extending substantially below it is a vertical supporting frame 17. This supports teat cup storing means 19 in the form of a horizontally spaced pair of pulleys wheels 19', 19" for each teat cup. Milk line 11 has a teat cup 21 at one end and passes between the two pulley wheels 19', 19". These are spaced apart on a horizontal beam 23 at the lower end of vertical supporting frame 17 so that they act as a stop mean which prevents the passage of teat cup 21 between them while allowing milk line 11 to pass freely. Teat cup 21 can thereby be stored upside-down in contact with said pulley wheels 19', 19" when milk line 11 is retracted as described later. Vertical supporting frame 17 also supports teat cup cleaning means 25. Teat cup cleaning means 25 comprises a sleeve 27 which is attached around vertical supporting frame 17 and is able to move freely up and down vertical supporting frame 17. A C-shaped bracket 29 comprising an upper arm 31, a stem 33 and a lower arm 35 is pivotably attached to sleeve 27 by a rotatable joint 37. Lower arm 35 supports a cleaning fluid supply means 39 having an outlet such as a spray nozzle 41, connected to a cleaning fluid supply line 43. Lower arm 35 can support a protective flap 45 which hangs down below spray nozzle 41 to reduce excess cleaning fluid from splashing too much. Sleeve 27 is connected to first vacuum cylinder 13' by a first lift line 47. First lift line 47 is connected to the piston (not shown) of first vacuum cylinder 13' and lifts sleeve 27, and consequently teat cup cleaning means 25, to an upper position when no vacuum is applied to first vacuum cylinder 13'. Upper arm 31 is connected by a bracket 49 to a second lift line 51 to the piston (not shown) of second vacuum cylinder 13" and pivots C-shaped bracket 29 to an upper position about rotatable joint 37 with respect to sleeve 27 when no vacuum is applied to a second vacuum cylinder 13". Milk line 11 is looped over a pulley wheel 53 connected by a milk line retracting line 53 to the piston (not shown) of milk line retracting means vacuum cylinder 9. When no vacuum is applied to vacuum cylinder 9 the pulley wheel 53 is retracted to its upper position and teat cup 21 is pulled up into contact with stop pulley wheel pair 19', 19". Thus when none of the vacuum cylinders 9, 13', 13" are connected to vacuum then the teat cup 21 and teat cup cleaning means 25 are in the positions shown in FIG. 1.

Figure 2:
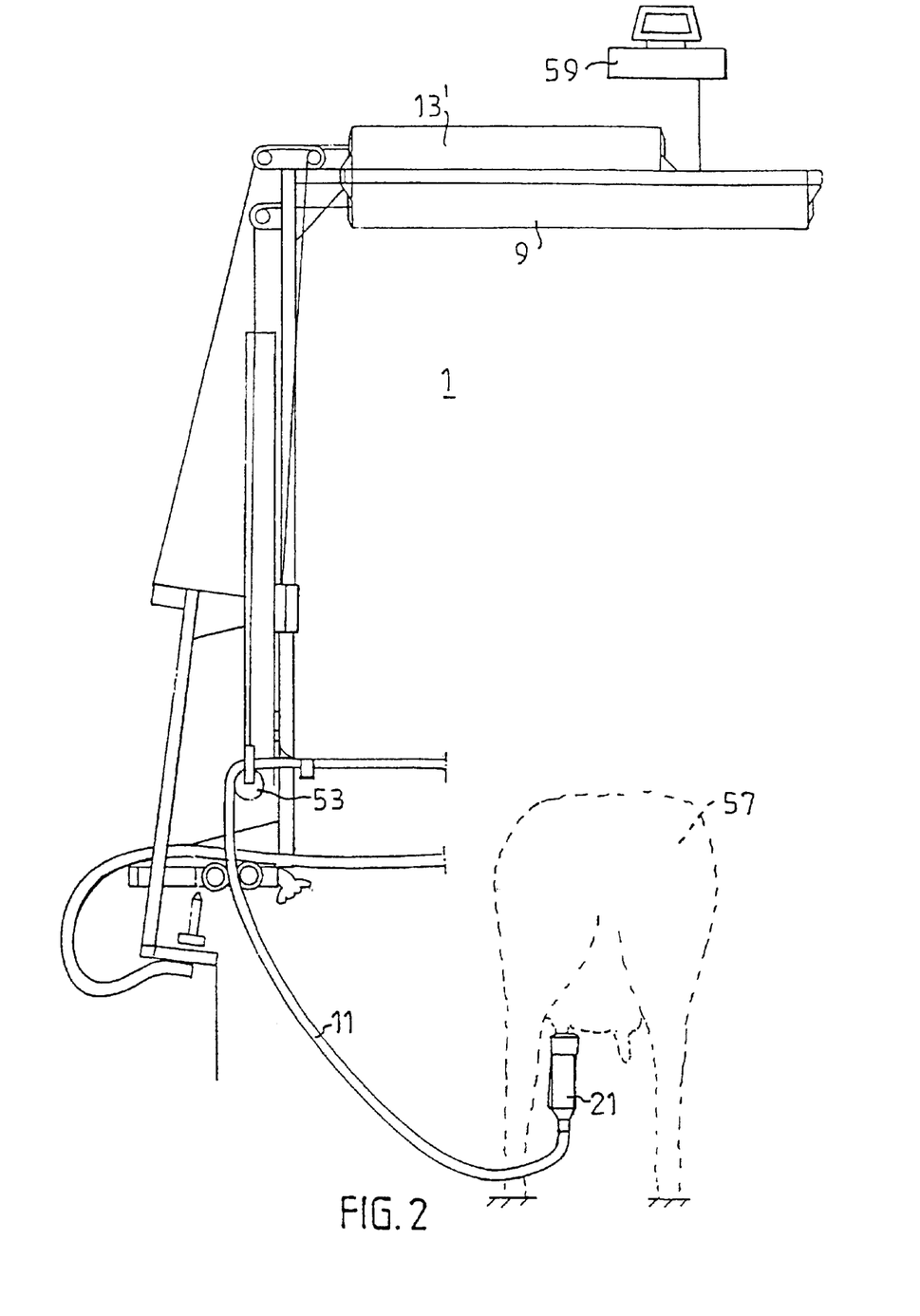
FIG. 2 shows an end view similar to FIG. 1 of the teat cup holding rack when a teat cup has been positioned on a teat.

FIG. 2 shows the teat cup holding rack 1 when teat cup 21 has been positioned under a diary animal 57 shown by dashed lines. The teat cup 21 can be positioned manually or, preferably, by a robot arm (not shown) under the command of a milking machine control means such as computer 59. In order to permit teat cup 21 to move away from the teat cup supporting pair of pulley wheels 19', 19", computer 59 opens the valve (not shown) of milk line vacuum cylinder 9 and subjects its piston to a vacuum. This piston moves to the left in the figure which allows milk line retracting line 55 to extend and lower pulley wheel 53 and milk line 11.

Figure 3:
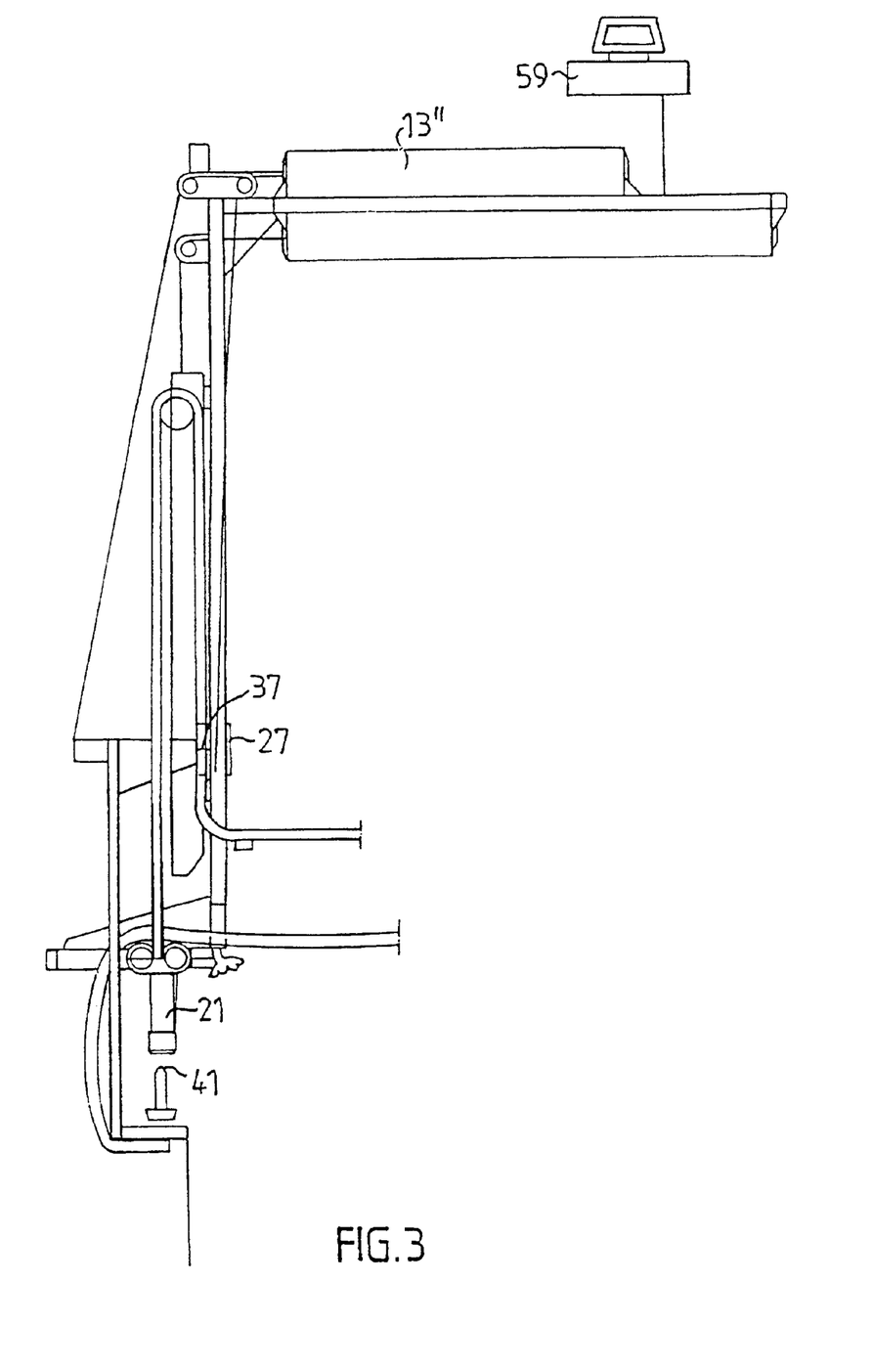
FIG. 3 shows an end view similar to FIG. 1 of the teat cup holding rack when a teat cup has been returned to its stored position and a teat cup cleaning means has been moved to a low position.

FIG. 3 shows the teat cup holding rack 1 when teat cup 21 has been retracted by vacuum cylinder 9 being opened to atmospheric pressure which retracts milk line retracting line 55 which in turn pulls up pulley wheel 53 and milk line 11 until teat cup 21 is stopped between pulley wheels 19', 19". At the same time vacuum has been applied to vacuum cylinders 13', 13". This has caused the pistons (not shown) in the cylinder 13', 13" to move to the left in the figure and the first and second lift lines 47 resp. 51 to extend. This causes sleeve 27 to slid down vertical supporting frame 17 to its lowest position and C-shaped frame 29 to pivot to its lowest position in which spray nozzle 41 is directly below teat cup 21.

Figure 4:
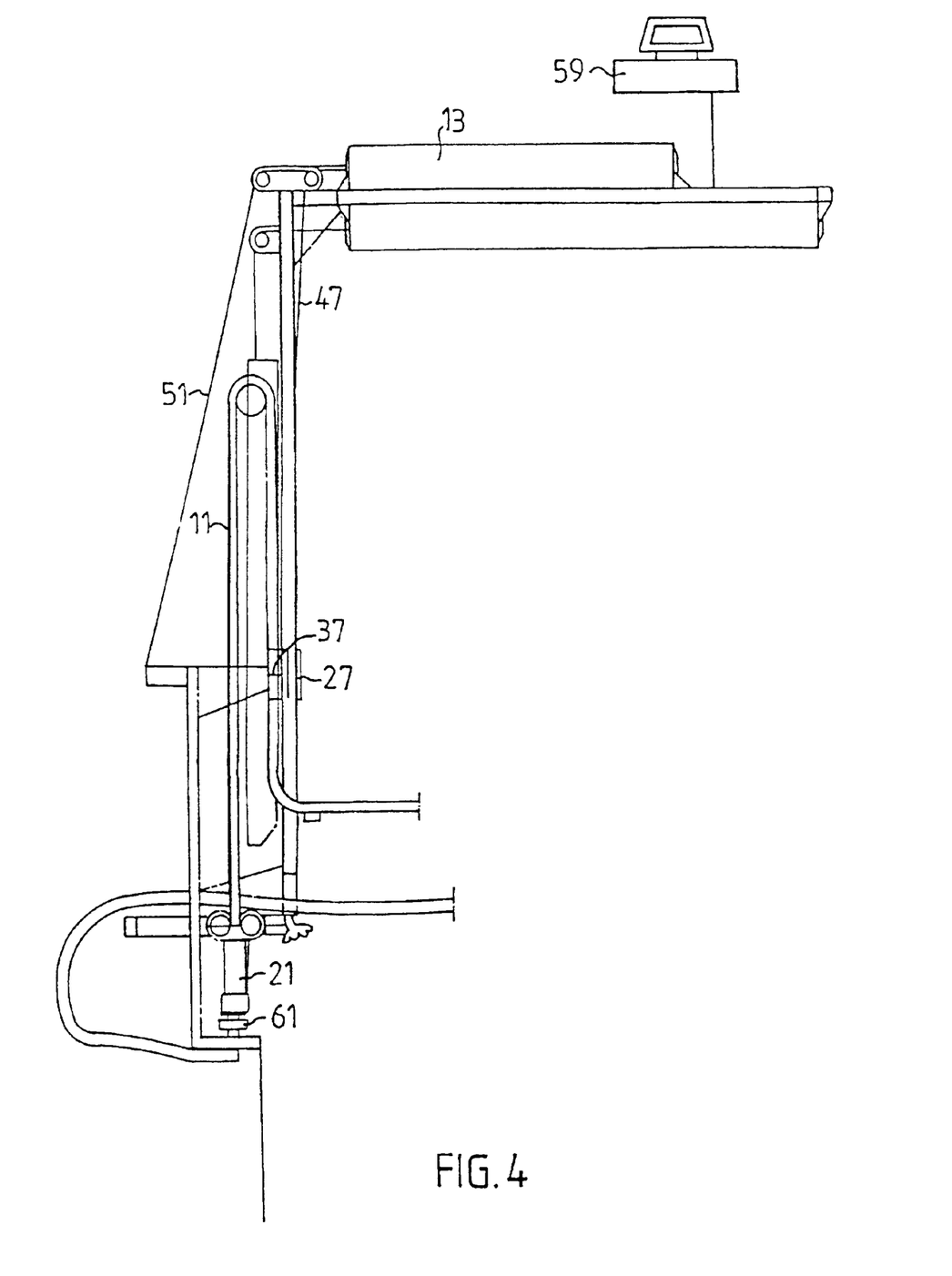
FIG. 4 shows an end view similar to FIG. 1 of the teat cup holding rack when teat cup cleaning means has been moved to a teat cup cleaning position.
Figure 5:
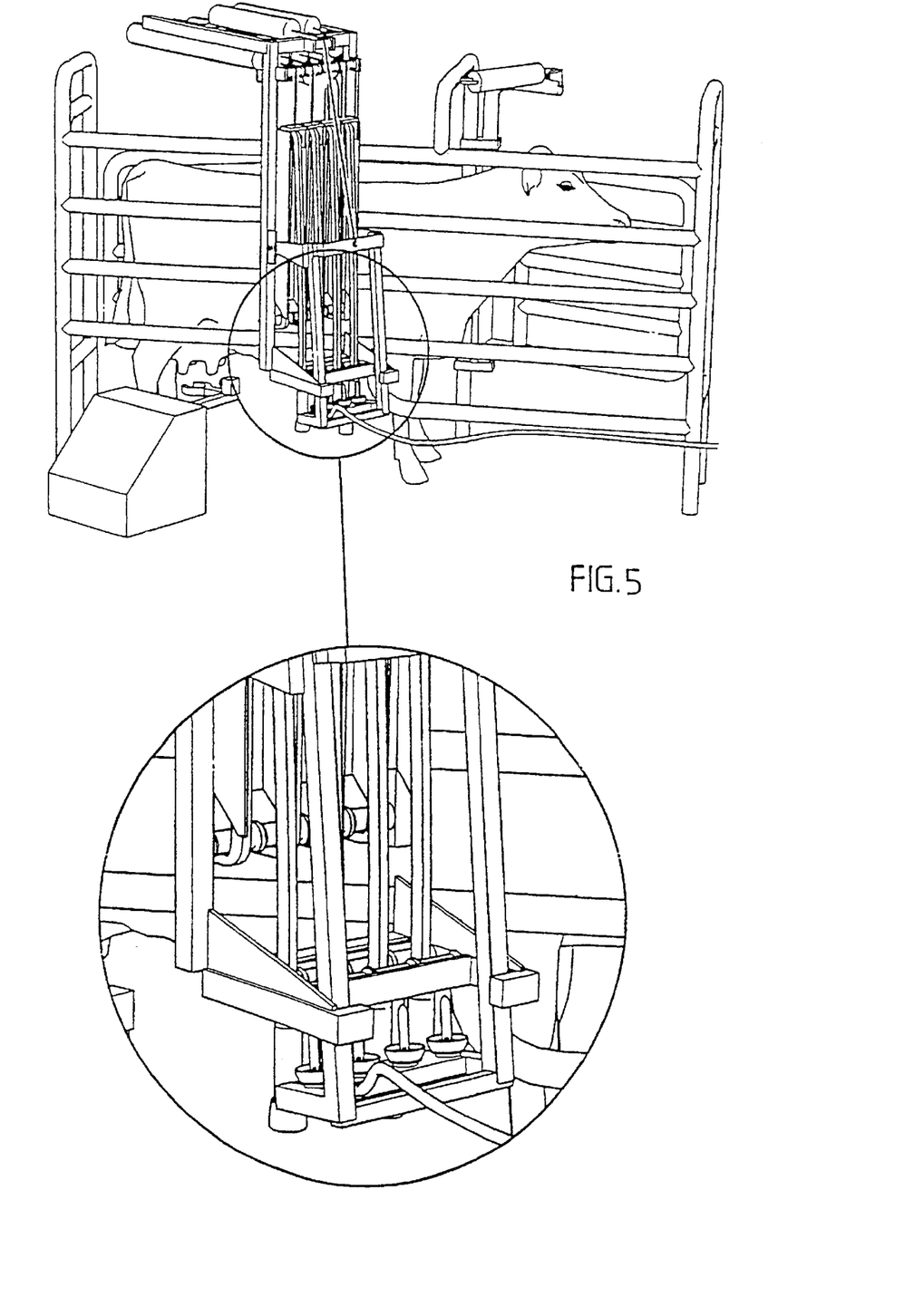
FIGS. 5–9 show a perspective view of the embodiment of a teat cup holding rack shown in FIGS. 1–4.
Figure 6:
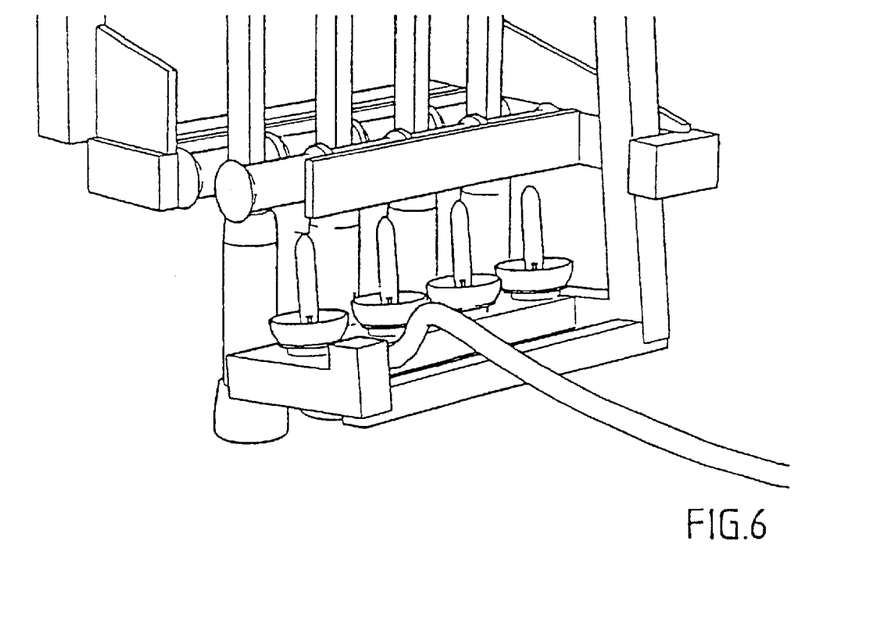
Figure 7:
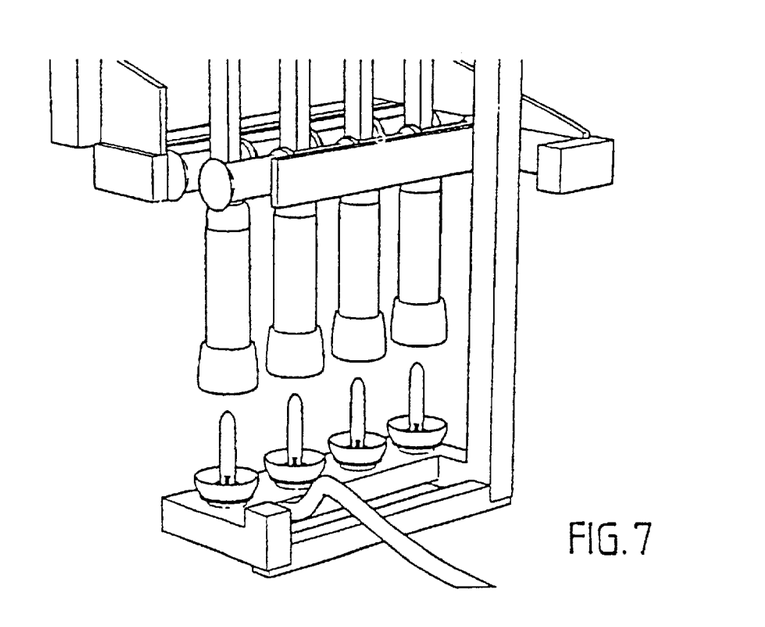
Figure 8:
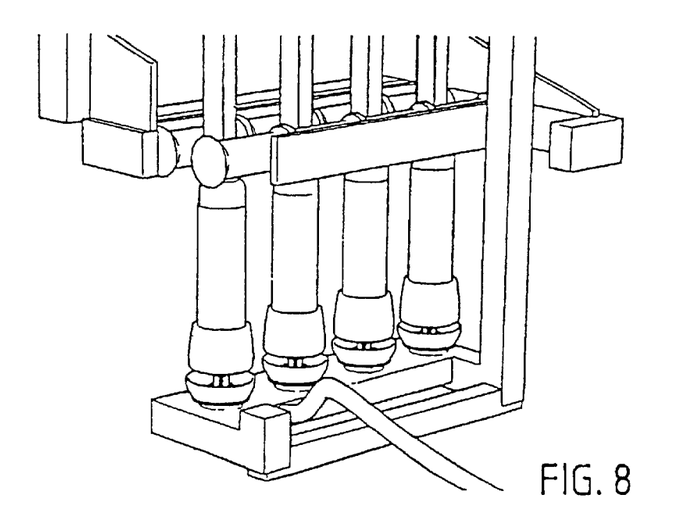
Figure 9:
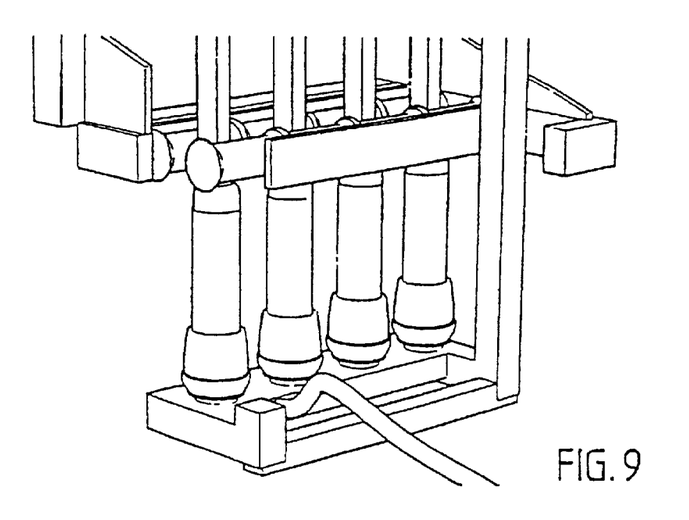

FIG. 4 shows the teat cup holding rack 1 when the teat cup cleaning means 25 has been moved up from the position shown in FIG. 3 to a rinsing position in which spray nozzle 41 is partly inserted into teat cup 21. This is achieved by opening vacuum cylinder 13' to atmosphere which causes first lift line 47 to lift sleeve 27 upwards until it reaches its upper position. In this position there is a gap between a sealing means such as a sealing collar 61 at the base of cleaning fluid supply means 39 and the open end of teat cup 21. In this position cleaning fluid can be sprayed out of spray nozzle 41 into teat cup 21 in order to rinse it. The used cleaning fluid runs out of teat cup 21 through the gap between teat cup 21 and sealing collar 61. Rinsing of the teat cups can be performed between each milking.

When it is necessary to clean milk line 11, for example, at the end of the day or milking session then it is necessary to close the gap between the collar 61 and teat cup 21. This is achieved by connecting the milk line vacuum cylinder 9 to vacuum thereby allowing milk line retractor line 55, pulley 53, milk line 11 and teat cup 21 to fall until teat cup 21 rests on sealing collar 61. As the teat cup supports the weight of milk line 11 is seals firmly with sealing collar 61. Milk line 11 can then be connected to vacuum and cleaning fluid supply line 43 connected to a source of cleaning fluid. This cleaning fluid flows out of spray nozzle 41 in the milk line and is sucked the whole length of milk line 11 to a suitable disposable area, not shown. When the cleaning is finished, the flow of cleaning fluid is stopped and the suction in milk line 11 removed. Milk line retracting means vacuum cylinder 9 is then subjected to atmospheric pressure which causes milk line retracting line 55 to retract which causes milk line 11 to lift teat cup 21 off sealing collar 61. Any cleaning fluid left in milk line 11 can then drain out milk line 11 via the newly opened gap between teat cup 21 and sealing collar 61.

In order to clean the outside of the milk line 11 and teat cup 21, the horizontal beam 23 or some other suitable part of frame 3 can be provided with one or more cleaning nozzles such as shower head 63 which can spray cleaning fluid in the vicinity of the pair of pulleys 19', 19". Cleaning fluid can be sprayed out of shower head 63 when milk line 11 is being retracted. This ensures that all of the milk line 11 which could have been in contact with the diary animal or the ground is cleaned as it is retracted. As well as having a hygienic function this cleaning which takes place when the milk lines are retracted at the end of the milking session also act as a signal to the diary animal that has been milked that the milking session is over and that it is time for it to leave the milking stall. It also acts as a signal to any waiting animals that they can now enter the stall.

In order to aid comprehension of the invention FIGS. 5–9 show a perspective view of the embodiment of a teat cup holding rack described above.

In a second embodiment of the invention the teat cup holding rack is provided with additional cleaning fluid nozzles which direct cleaning fluid onto the floor of the stall. This floor is preferably sloping at a shallow angle e.g. 3'–4° towards a gutter. The cleaning fluid from the nozzles washes any dirt or contaminants into the gutter which drains it away to a suitable disposable place. As this cleaning fluid would wet the legs of any animal in the stall it can encourage milked animals to leave the stall more rapidly thereby speeding up the milking process.

In a further embodiment of the present invention (not shown) the nozzle 41 is so arranged that it produces vertically directed streams of cleaning fluid which are so directed that it is not necessary to partly insert the nozzle into the teat cup 21 in order to clean it.

In yet another embodiment of the invention (not shown) the spray nozzle is displaceable linearly with respect to the C-shaped frame by means of an actuator. In this way it is possible to fix the C-shaped frame rigidly to the sleeve. The movement of the nozzle from the position not vertically below the teat cup to a position vertically below the teat cup being accomplished by the horizontal linear movement of said actuator.

In another embodiment of the invention the milk line can be retracted by a retractor line or cable attached directly to some part of the milk line instead of a pulley wheel, or even by a line attached to the teat cup.

While the invention has been illustrated by the use of vacuum (pneumatic) actuators any other suitable actuators such as electric motors, hydraulic actuators or the like may also be used. Furthermore the lift line can be made of any suitable material such as chain, wire, rope or can be replaced by equivalent devices which lead to the same result.

What is claimed is:

1. Teat cup holding rack (1) for use in a milking machine comprising a teat cup (21) connected to a milk line (11), teat cup cleaning means (25) with cleaning fluid supply means (41), and teat cup storing means (19', 19"), characterized in that it further comprises milk line retracting means (9, 53, 55) for retracting said milk line (11) until said teat cup (21) is positioned upside down and in contact with said teat cup storing means (19', 19"); and teat cup cleaning means actuating means (13") for moving said cleaning fluid supply means (41) from a position not underneath said teat cup (21) to a position substantially vertically below said teat cup (21).

2. Teat cup holding rack (1) according to claim 1, characterized in that it comprises a second teat cup cleaning means actuating means (13') for moving said cleaning fluid supply means (41) from said position substantially vertically below said teat cup (21) to a position where said cleaning fluid supply means (41) are inside said teat cup (21).

3. Teat cup holding rack (1) according to claim 1, characterized in that it comprises cleaning nozzles (63) for cleaning the exterior of the teat cup (21) and milk line (11).

4. Teat cup holding rack (1) according to claim 1, characterized in that said teat cup cleaning means (25) is pivotable from said position not underneath said teat cup (21) to said position substantially vertically below said teat cup (21).

5. Teat cup holding rack (1) according to claim 1, characterized in that it comprises means (13', 47, 27) for lowering said teat cup into a sealing position on a sealing means (61) on said teat cup cleaning means (25).

6. Teat cup holding rack (1), characterized in that said milk line retracting means (9, 53, 55) comprise an actuator means (9) and a retractor line (55) wherein said retractor line (55) is attached to a pulley (53) supporting said milk line (11) or to said milk line (11) or to a teat cup (21) attached to said milk line (11).

7. Method for cleaning teat cups (21) in a teat cup holding rack (1) for use in a milking machine, wherein said teat cup holding rack (1) comprises a teat cup (21) connected to a milk line (11), teat cup cleaning means (25) with cleaning fluid supply means (41), and teat cup storing means (19', 19"), characterized by the steps of:

retracting said milk line (11) until said teat cup (21) is positioned upside down and in contact with said teat cup storing means (19', 19");

moving said cleaning fluid supply means (41) from a position not underneath said teat cup (21) to a position where said cleaning fluid supply means (41) is substantially vertically below said teat cup (21); and, spraying cleaning fluid out of said cleaning fluid supply means (41) into said teat cup (21).

8. Method in accordance with claim 7, characterized by the further step of:

raising said cleaning fluid supply means (41) into said teat cup (21).

9. Method in accordance with claim 7, characterized by the further steps of:

lowering said teat cup (21) until it is in sealing contact with sealing means (61) on cleaning fluid supply means (41); and applying a vacuum to milk line (11).

10. Method in accordance with claim 7, characterized by the steps of:

providing equipment spraying means (61) for spraying cleaning fluid onto said milk line (11) and said teat cup holding rack, when said milk line (11) is being retracted; and spraying cleaning fluid onto said milk line (11) when it is being retracted.

* * * * *